United States Patent Office 3,425,994
Patented Feb. 4, 1969

3,425,994
PROCESS FOR THE MANUFACTURE OF A LINEAR POLYESTER USING STANNOUS OXALATE AS A POLYCONDENSATION CATALYST
Herbert Fitz, Burgkirchen (Alz), Germany, assignor to Kalle Aktiengesellschaft, Wiesbaden,Biebrich, Germany
No Drawing. Filed Jan. 19, 1966, Ser. No. 521,530
Claims priority, application Germany, Jan. 22, 1965,
K 55,075
U.S. Cl. 260—75      9 Claims
Int. Cl. C08g 17/06, 17/08, 17/015

ABSTRACT OF THE DISCLOSURE

This invention relates to a process for the preparation of a linear polyester which comprises polycondensing a bis-hydroxyalkyl ester of an aromatic or aliphatic dicarboxylic acid, other than bis-hydroxyethyl terephthalate, in the presence of stannous oxalate as a polycondensation catalyst and under effective polycondensation conditions.

In copending application Ser. No. 343,235, filed Feb. 7, 1964, a process is described for the manufacture of a linear polyester by reesterification of a terephthalic acid dialkyl ester, preferably terephthalic acid dimethyl ester, with ethylene glycol in the presence of reesterification catalysts and polycondensation of the reesterification product with the addition of a condensation catalyst and, if required, an antioxidant. The polycondensation is performed using stannous oxalate as a condensation catalyst.

The process advantageously is carried out in a manner such that the polycondensation is effected with a reesterification product which contains one of the acetates of zinc, cobalt, manganese, or calcium, or mixtures of such acetates such as a mixture of cobalt acetate and calcium acetate, and, if required, using phosphorous acid or triphenyl phosphite as an antioxidant.

It now has been found that by following the method of the copending application, supra, the manufacture of linear polyesters generally can be performed. The present modification of the foregoing process thus relates to the manufacture of linear polyesters of aromatic or aliphatic dicarboxylic acids which is performed by reesterification of dialkyl esters, preferably dimethyl esters, of the dicarboxylic acids referred to above with aliphatic diols, with the exception of terephthalic acid dialkyl esters with ethylene glycol, in the presence of reesterification catalysts and with polycondensation of the reesterification products, if required with the addition of antioxidants. The polycondensation is effected using stannous oxalate as a condensation catalyst. The advantages of the process of the present invention are the same as those indicated in the copending application, supra, for the process described therein and the polycondensation product manufactured thereby, i.e., polyethylene terephthalate.

The invention will be further illustrated by reference to the following example:

Example 1

A number of linear polyesters were produced as follows:
In a quantity corresponding to 100 grams of end product, the dimethyl esters of a number of dicarboxylic acids were quantitatively reesterified at a molar ratio of 1:2.5 with a diol using $2 \times 10^{-4}$ mole of zinc acetate per mole of dicarboxylic acid ester. Stannous oxalate then was added as a condensation catalyst and polycondensation was effected at a temperature of 275° C. and a pressure of 0.5 mm. Hg.

Also, 0.025% by weight of triphenyl phosphite (antioxidant) was added together with the stannous oxalate, although not absolutely necessary. The operating conditions and the results of the polycondensations are summarized in the following table and are numbered from 1 to 7. Comparative tests were carried out with the same starting materials and under the same conditions, but using antimony trioxide, $Sb_2O_3$, as a condensation catalyst. They are indicated in the table by Nos. 1a to 7a.

| No. | Dicarboxylic acid | Diol | Catalyst | Amount (moles) | Temperature, °C. | Duration (min.) | Specific Viscosity, cp. |
|---|---|---|---|---|---|---|---|
| 1 | Terephthalic acid | Butane diol 1,3 | Stannous oxalate | $4 \times 10^{-4}$ | 260 | 120 | 1,240 |
| 1a | do | do | $Sb_2O_3$ | $4 \times 10^{-4}$ | 260 | 180 | 357 |
| 2 | do | Hexane diol 1,6 | Stannous oxalate | $4 \times 10^{-4}$ | 275 | 90 | 1,221 |
| 2a | do | do | $Sb_2O_3$ | $4 \times 10^{-4}$ | 275 | 120 | 346 |
| 3 | Sebacic acid | Ethylene glycol | Stannous oxalate | $2 \times 10^{-4}$ | 275 | 90 | 1,892 |
| 3a | do | do | $Sb_2O_3$ | $2 \times 10^{-4}$ | 275 | 180 | 560 |
| 4 | Decane dicarboxylic acid 1,12 | do | Stannous oxalate | $2 \times 10^{-4}$ | 275 | 180 | 1,760 |
| 4a | do | do | $Sb_2O_3$ | $2 \times 10^{-4}$ | 275 | 180 | 430 |
| 5 | Iso-terephthalic acid mixture (80/20) | do | Stannous oxalate | $2 \times 10^{-4}$ | 275 | 180 | 960 |
| 5a | do | do | $Sb_2O_3$ | $2 \times 10^{-4}$ | 275 | 120 | 258 |
| 6 | Hexahydroterephthalic acid (cis/trans mixture) | do | Stannous oxalate | $2 \times 10^{-4}$ | 275 | 180 | 477 |
| 6a | do | do | $Sb_2O_3$ | $2 \times 10^{-4}$ | 275 | 180 | 275 |
| 7 | Adipic acid | do | Stannous oxalate | $2 \times 10^{-4}$ | 275 | 180 | 821 |
| 7a | do | do | $Sb_2O_3$ | $2 \times 10^{-4}$ | 275 | 180 | 694 |

What is claimed is:
1. A process for the preparation of a linear polyester which comprises polycondensing a bis-hydroxyalkyl ester of an acid selected from the group consisting of aromatic and aliphatic dicarboxylic acids, other than bis-hydroxyethyl terephthalate, in the presence of stannous oxalate as a polycondensation catalyst and under effective polycondensation conditions.

2. A process according to claim 1 for the preparation of a linear copolyester which comprises polycondensing a mixture of bis-hydroxyalkyl esters of acids selected from the group consisting of aromatic and aliphatic dicarboxylic acids contained in a reesterification mixture obtained from dialkyl esters of dicarboxylic acids with aliphatic diols with a reesterification catalyst.

3. A process according to claim 1 in which the polycondensation is effected in the presence of a compound selected from the group consisting of trivalent and pentavalent phosphorus compounds.

4. A process according to claim 3 in which the phosphorus compound is triphenyl phosphite.

5. A process according to claim 3 in which the phosphorus compound is phosphorus acid.

6. A process according to claim 2 in which the stannous oxalate is present in a quantity in the range of about 0.005 to 0.1 per unit by weight, based on the quantity of dialkyl ester employed.

7. A process according to claim 2 in which the reesterification catalyst is selected from the group consisting of zinc acetate, cobalt, acetate, manganese acetate, calcium acetate, and mixtures thereof.

8. A process according to claim 2 in which the reesterification catalyst is calcium acetate and phosphorus acid is employed as an antioxidant.

9. A process according to claim 2 in which the reesterification catalyst is a mixture of calcium acetate and cobalt acetate.

References Cited

UNITED STATES PATENTS

| 2,465,319 | 3/1949 | Whinfield et al. | 260—75 |
|-----------|--------|------------------|--------|
| 2,921,051 | 1/1960 | Amborski et al. | 260—75 |
| 3,055,869 | 12/1962 | Wilson et al. | 260—75 |
| 3,057,824 | 10/1962 | Le Bras et al. | 260—75 |
| 3,070,575 | 12/1962 | Cramer | 260—75 |
| 3,110,547 | 11/1963 | Emmert | 260—75 |
| 3,194,791 | 7/1965 | Wilson et al. | 260—75 |
| 3,245,959 | 4/1966 | Roeser | 260—75 |

WILLIAM H. SHORT, *Primary Examiner.*

LOUISE P. QUAST, *Assistant Examiner.*